Nov. 18, 1969

L. L. RUTER 3,478,463

FLOATABLE FISH BASKET

Filed Sept. 19, 1968

INVENTOR.
LEWIS L. RUTER
BY
*Burd, Braddock & Bartz*

ATTORNEYS

United States Patent Office 3,478,463
Patented Nov. 18, 1969

3,478,463
FLOATABLE FISH BASKET
Lewis L. Ruter, 218 26th Ave. N.,
Minneapolis, Minn. 55411
Filed Sept. 19, 1968, Ser. No. 760,913
Int. Cl. A01k 63/00, 71/00, 97/00
U.S. Cl. 43—55                                    10 Claims

ABSTRACT OF THE DISCLOSURE

A collapsible wire fish basket having a funnel-shaped inlet ring releasably fastened to an annular floatation collar. The ring is partly supported on an inner peripheral annular portion of the floatation collar.

SUMMARY OF INVENTION

The invention broadly relates to a combined container and float member for supporting the container in a body of water. More particularly, the invention is directed to a collapsible fish basket supported on a floatation collar. A plurality of fastener means function to hold the upper end of the fish basket in assembled relation with the inner peripheral portion of the floatation collar. The fish basket is foldable into nested relation relative to the floatation collar so that it is easy to transport and store and yet at the same time ready for use without connecting various parts together.

Figure 1:
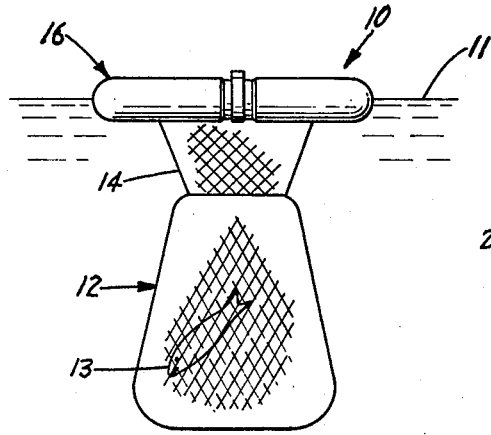
FIGURE 1 is a side elevational view of a fish basket in assembled relation with a floatation collar located in the body of water.

Referring to FIGURE 1, there is shown a floatation and container assembly indicated generally at 10 in a body of water 11, as a lake, river or the like. The floatation and container assembly 10 has a flexible and foldable container 12, shown as a meshed wire basket for confining fish 13 in the water 11. Container 12, hereinafter referred to as a fish basket, may be any container or object which is to be carried in the water. Joined to the top of basket 12 is a funnel-shaped inlet 14 carried by a floatation collar indicated generally at 16. The floatation collar 16 holds the basket 12 in a generally downwardly extended position in the body of water 11.

Figure 2:
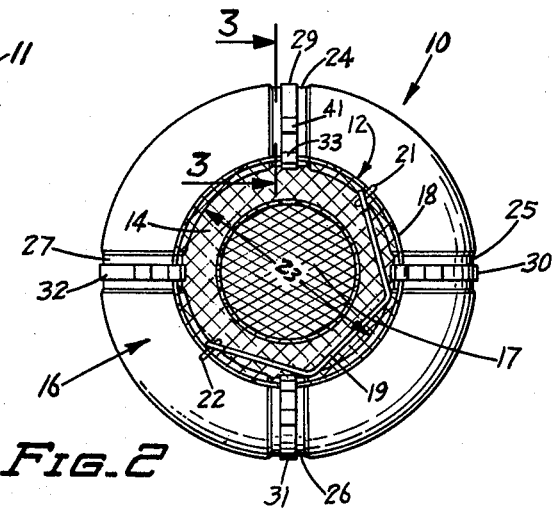
FIGURE 2 is an enlarged plan view of FIGURE 1.

Referring to FIGURE 2, the opening between the inlet 14 of basket 12 is closed with a circular wire mesh cover 17. The bottom of the basket 12 is provided with a similar cover providing an exit opening. The top of inlet 14 has a circular ring 18 holding the inlet 14 in an opened circular position. Attached to the ring 18 is a handle 19 pivotally mounted to the diametrically opposite sides of the ring with small fastener rings 21 and 22.

The inner diameter 23 of the collar 16 is at least equal to but preferably smaller than the diameter of the ring 18. When the collar 16 is assembled on the basket 12 the ring 18 is supported on inner peripheral portions of the collar. The concentric relationship between the ring 18 and collar 16 centralizes the basket 12 on the collar 16.

Figure 3:
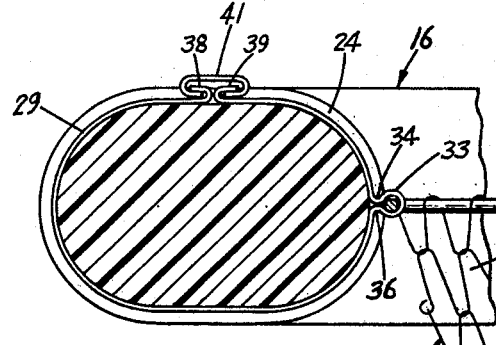
FIGURE 3 is an enlarged sectional view taken along the line 3—3 of FIGURE 2.

The collar 16, shown in FIGURE 3, has a generally oval cross-section and is made of material having a specific gravity less than water so that the collar 16 will float. Examples of the collar material are plastic materials, as expanded polystyrene (styrofoam), and like floatable material.

As shown in FIGURE 2, collar 16 has circumferentially spaced circular radial recesses 24, 25, 26 and 27. Connectors 29, 30, 31 and 32 located in the recesses hold the ring 18 in assembled relation with the collar 16. The connectors 29, 30, 31 and 32 are identical in structure and function. The following description is limited to connector 29 shown in FIGURE 3.

Connector 29 is a band or strip of flexible material, as sheet metal formed with a clamp loop 33 having inwardly curved neck sections 34 and 36. The loop 33 has an eye for accommodating the ring 18. The ends of the band have reverse bend opposite facing hooks 38 and 39 for receiving a clip 41 having facing hook-shaped ends. The clip 41 coacts with the hooks 38 and 39 to hold the band firmly on the collar 16. The clip 41 is laterally movable relative to the hooks 38 and 39 to release the band so that it can be removed from the collar.

The loop 33 positions the ring 18 in close supporting relationship relative to the inner peripheral surface of the collar 16 so that the ring 18 is fixedly held relative to the collar 16. The neck sections 34 and 36 are closed about the ring 18 and permit some elongation of the band with a minimum of movement of the ring on the collar.

Basket 12 can be separated from the collar 16 by merely removing the clips 41. The bands and clips are easily mounted adaptors for connecting a wire fish basket to a circular floatation collar. On assembly of the band on the ring 18 the neck sections 34 and 36 spread allowing the ring 18 to be placed in the eye of the loop 33. This band is simple in construction, easy to manufacture and to connect to a top ring of a fish basket and to attach to a floatation collar.

A specific example of the basket and floatation collar assembly usable for pan fish comprises an annular polystyrene collar having a thickness of about 3 inches, an inner diameter of 9½ inches and an outer diameter of 17 inches. The basket ring has a diameter of 9½ inches. The connectors 29 to 32 hold the ring on the collar.

In another example of the basket and floatation collar assembly the ring of the basket has a diameter of about 1 inch greater than the inner diameter of the collar so that the top wire portion of the basket inlet engages the collar along with the ring.

Figure 4:
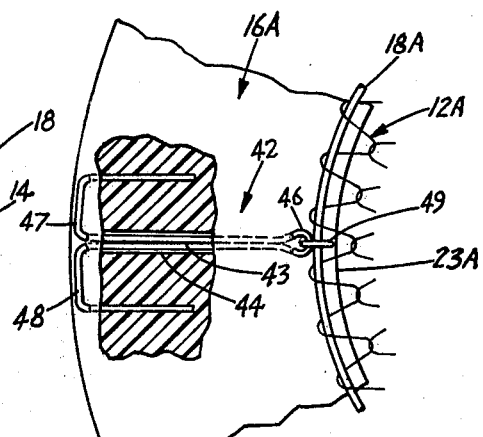
FIGURE 4 is a fragmentary plan view partly sectioned of a modified connector used to attach the top ring of the fish basket to a floatation collar.

Referring to FIGURE 4, there is shown another form of the connector indicated generally at 42 for attaching the fish basket ring 18A to the floatation collar 16A. A number of spaced connectors 42 locate the ring 18A adjacent the inner diameter 23A of the collar 16A so that the ring 18A is supported on the annular inner peripheral portion of the collar. Connector 42 has a double wire pin 43 located in a horizontal radial hole 44 in the collar 16A. The inner end of pin 43 form a small loop 46 which projects a small distance from the inside surface of the collar providing an eye accommodating a small ring 49 to attach the basket ring 18A to the connector. The opposite or outer ends of the pin 43 have large inwardly turned hooks 47 and 48 which project back into the collar 16A thereby preventing the pin from moving inwardly through the hole 44. The ring 18A being attached to the loop 46 with a small connector ring 49 prevents the pin from moving outwardly from the collar 16A. The ring 18A is attached to various portions of the collar by inserting a plurality of circumferentially spaced pins through the collar. The number of pins may vary. Preferably 3 or 4 equally spaced pins are sufficient to hold the ring 18A in assembled relation with the collar 16A.

Figure 5:
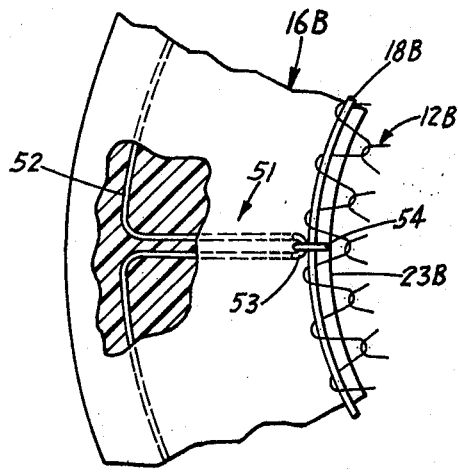
FIGURE 5 is a further modification of the connector used to attach the top ring of the fish basket to a floatation collar.

Referring to FIGURE 5 there is shown another modification of the connector indicated generally at 51 to attach the basket ring 18B to the floatation collar 16B. Connector 51 comprises a continuous circular wire member 52 imbedded in the floatation collar 16B. A wire member 52 has inwardly directed elongated loops 53 which extend through an inner peripheral portion of the collar adjacent the wire ring 18B.

The wire member 52 has a number of inwardly directed loops 53 around the collar 16B to provide spaced anchoring loops for attaching circumferentially spaced portions of the ring 18B to the floatation collar. Small connector rings 54 attach the ring 18B to the collar 16B.

Figure 6:
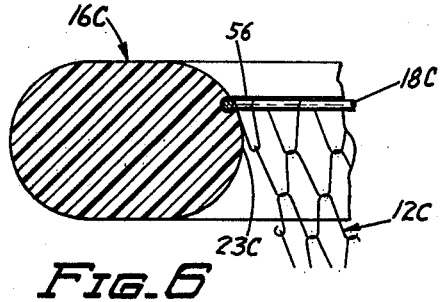
FIGURE 6 is a further modification of the structure for connecting the top ring of the fish basket to a floatation collar.

Referring to FIGURE 6, there is shown an additional modification of structure to mount the basket ring 18C to the inner peripheral portion of the flotation collar 16C above the minimum diameter 23C of the flotation collar. The floatation collar 16C has an annular horizontal groove 56 above the horizontal center line of the floatation ring. The groove 56 has a diameter slightly smaller than the diameter of the basket ring 18C so that the ring 18C will fit with a tight fit in the groove 56. The outwardly directed biasing force of the deformed ring 18C will hold the ring in the groove 56 thereby attaching the basket 12C to the floatation collar 16C.

In summary, the floatation and basket assembly is particularly useful for independently supporting a fish basket near the surface of water so that it can be conveniently located relative to the fisherman and does not sink on being released from the boat or pier. The floatation and basket assembly utilizes the ring upon the upper portion of the basket inlet to attach the basket to the floatation collar. The floatation collar surrounds the ring and is held in assembled relation with the ring by connector means. The connector means shown comprise circumferentially spaced releasable bands radially surrounding the collar and attach to the ring. In FIGURES 4, 5 and 6 there are shown modifications of the connector means for holding the rings 18A, 18B and 18C in the assembled relation with the inner peripheral surface of the floatation collars 16A, 16B and 16C.

The embodiments of the invention in which an exclusive property or privilege is claimed are defined as follows:

1. A floatation and container assembly comprising: a container having a ring attached to an upper portion of the container, a floatation collar surrounding said ring, and connector means associated with the collar for attaching the collar to the ring.

2. The assembly of claim 1 wherein the container is a wire backet, said ring forming the top opening into the basket, said collar is an annular foamed plastic member having an inner diameter smaller than the diameter of the ring whereby the ring rests on inner portions of the collar.

3. The assembly of claim 2 wherein the connector means comprise bands surrounding the collar having loops located about the ring and fastener members means holding the bands around the collar.

4. The assembly of claim 3 wherein the collar has circumferentially spaced radial recesses around the collar, said bands being located in said recesses.

5. The assembly of claim 2 wherein the connector means comprise pins extended radially through the collar and fastener means connecting the ring to the pins.

6. The assembly of claim 2 wherein the connector means comprise a substantially continuous member imbedded in the collar, said continuous member having inwardly directed loops, and fastener means connecting the ring to the loops.

7. The assembly of claim 2 wherein the connector means comprise an annular groove in the inner periphery of the collar, said groove having a diameter not greater than the diameter of the ring whereby the ring firmly fits into the groove.

8. The assembly of claim 2 wherein the connector means comprise circumferentially spaced bands radially surrounding the collar and attached to the ring.

9. The assembly of claim 8 wherein each band has releasable means for holding the bands on the collar.

10. The assembly of claim 8 wherein the collar has circumferentially spaced radial recesses, said bands being located in said recesses.

References Cited

UNITED STATES PATENTS

| | | | |
|---|---|---|---|
| 1,841,956 | 1/1932 | Juergens | 43—55 |
| 2,573,352 | 10/1951 | Nicodemus | 43—55 |
| 2,603,028 | 7/1952 | Roberts | 43—55 |
| 2,968,887 | 1/1961 | Woolworth | 43—56 |

WARNER H. CAMP, Primary Examiner